US007110509B2

United States Patent
Kreten et al.

(10) Patent No.: US 7,110,509 B2
(45) Date of Patent: Sep. 19, 2006

(54) GATEWAY FOR CONNECTING TELECOMMUNICATIONS NETWORKS AND A CORRESPONDING METHOD

(75) Inventors: Thomas Kreten, Puchheim (DE); Frederic Nicholson, Wellington, FL (US)

(73) Assignee: Siemens Aktiengellschaft, Munich (DE)

( * ) Notice: Subject to any disclaimer, the term of this patent is extended or adjusted under 35 U.S.C. 154(b) by 910 days.

(21) Appl. No.: 10/148,590

(22) PCT Filed: Dec. 1, 2000

(86) PCT No.: PCT/DE00/04289

§ 371 (c)(1),
(2), (4) Date: Jun. 3, 2002

(87) PCT Pub. No.: WO01/41459
PCT Pub. Date: Jun. 7, 2001

(65) Prior Publication Data
US 2002/0181690 A1 Dec. 5, 2002

(30) Foreign Application Priority Data
Dec. 3, 1999 (DE) ................. 199 58 233

(51) Int. Cl.
*H04M 1/69* (2006.01)
(52) U.S. Cl. ............. 379/88.17; 370/352; 370/401; 370/466; 370/467
(58) Field of Classification Search ........... 379/88.17; 370/466, 467, 401, 352
See application file for complete search history.

(56) References Cited

U.S. PATENT DOCUMENTS

| 5,852,660 A | 12/1998 | Lindquist et al. ............ 379/230 |
| 6,069,890 A * | 5/2000 | White et al. ................ 370/352 |
| 6,711,159 B1 * | 3/2004 | Grabelsky et al. .......... 370/353 |

OTHER PUBLICATIONS

XP-000830045; "Media Gateway Control Protocol and Voice Over IPGateways" by L-P. Anquetil et al.; *Alcatel Telecommunications Review*, 2nd Quarter, c. 1999.
XP-000877963; "Network Evolution the Ericsson Way" by Steinar Dahlin et al.; *Ericsson Review*, No. 4, c.1999.
XP000346720; "A Gateway Between an Eurocom D/1-Network and a Private PTT-Type CCITT SS7-Network"; by Tapani Nieminen et al., *Proceedings of the Military Communications Conference No. 11*; c. 1992.

* cited by examiner

*Primary Examiner*—Ahmad F. Matar
*Assistant Examiner*—Quynh H. Nguyen
(74) *Attorney, Agent, or Firm*—Morrison & Foerster LLP

(57) ABSTRACT

The invention relates to a gateway for connecting telecommunications networks, and to an associated method, in which a user channel data converter is connected via at least one additional user channel data interface to a switching center, and a signaling channel data converter is inserted between an already existing user/signaling channel data interface such that signaling information (SD(cic4)) which is transmitted on this data interface is filtered out for the additional user channel data interface. This results in a connection for a packet-switching telecommunications network without any major intervention in the network structure of a line-switching telecommunications network.

14 Claims, 4 Drawing Sheets

▨ = User data ND
▦ = Signaling data SD (x)
▒ = Signaling data for cic4 SD(cic4)

GATEWAY FOR CONNECTING TELECOMMUNICATIONS NETWORKS AND A CORRESPONDING METHOD

CLAIM FOR PRIORITY

The present application is a national stage of PCT/DE00/04289 which was published on Dec. 1, 2000 and which claims the benefit of priority to German Application No. 19958233.5 filed Dec. 3, 1999.

TECHNICAL FIELD OF THE INVENTION

The present invention relates to a gateway for connecting telecommunications networks, and to an associated method, and in particular, to a gateway for connecting a line-switching telecommunications network to a signaling network using the central signaling system no. 7, and having a packet-switching telecommunications network using the Internet Protocol.

BACKGROUND OF THE INVENTION

Line-switching telecommunications networks generally connect two subscriber terminals directly to one another via a number of line sections and switching centers in order to interchange messages (for example speech, data, text and/or pictures) That is, transmission in fixed allocated timeslots. Control information and signaling messages transmitted between switching centers for connection control. When using service features. Digital, computer-controlled telecommunications networks, in particular, offer a considerably greater performance scope than analog telecommunications networks, for which reason a new powerful signaling system has been introduced in digital computer-controlled telecommunications networks.

The ITU (International Telecommunication Union) has thus specified the central signaling system no. 7 (CCS7, common channel signaling system no. 7) for line-switching telecommunications networks, and this is optimized for use in digital networks.

In contrast to the previously normal channel-based signaling, in the case of CCS7, the signaling messages are passed via separate signaling paths or signaling data channels. One signaling data channel in this case transports the signaling messages for a large number of user channels.

In a line-switching telecommunications network, the signaling data channels for CCS7 connect so-called message transfer points (MTP) to one another. These message transfer points together with the signaling channels thus form an autonomous signaling network, which is superimposed on an associated user channel network.

Signaling points (SPC, signaling point code) are in this case the sources and sinks of the signaling traffic within the line-switching telecommunications network, and are primarily formed by switching centers or signaling nodes. In this case, the message transfer points transmit received signaling messages preferably using a destination address (destination point code, DPC) to another message transfer point. Such a message transfer point may either be integrated in a signaling end point, i.e. a switching center, or may form a dedicated signaling node in the signaling network. Furthermore, depending on the size of the signaling network, one or more levels of such message transfer points are possible.

All signaling points (SPC, signaling point code) in a predetermined signaling network are identified by, for example, a 14-point code within a numbering plan defined by the ITU, and can thus be addressed specifically in a signaling message. In the central signaling system no. 7 (CCS7), such a signaling message is provided by the message signaling unit (MSU, message signal unit).

In addition to the destination address (destination point code, DPC) and a source address (origin point code, OPC), a speech circuit address (circuit identification code, CIC) is essentially also stored in these signaling messages or message signaling units (MSU) transmitted in the signaling network. This speech circuit address (CIC) has 12 bits according to the ITU Standard, which are used to allocate the signaling message to a specific user channel. A speech circuit address (CIC) is in this case permanently allocated to each user channel, thus resulting in an extremely efficient line-switching telecommunications network.

However, as a result of the tremendous development of the INTERNET, there is an increasing need to connect such conventional line-switching telecommunications networks to so-called packet-switching or packet-oriented telecommunications networks, such as the INTERNET. However, as has already been mentioned above, since a line-switching telecommunications network with an associated signaling network represents an essentially closed system, a large number of problems arise if two telecommunications networks are simply coupled together.

FIG. 1 shows a simplified illustration of such different telecommunications networks, which are connected to one another via a conventional gateway. According to FIG. 1, the line-switching telecommunications network 1 (PSTN, public switched telecommunication network) comprises a large number of switching centers 3 and 4 (VST), which are connected via a large number of user and signaling channel data interfaces (lines). By way of example, a subscriber terminal device 6 (TE) is connected to at least one of the switching centers of the line-switching telecommunications network 1.

A gateway 5, which converts both the user channel data and the signaling channel data to the appropriate formats for the respective telecommunications networks is therefore required to produce a connection for a further subscriber terminal 7 (TE) which is connected to a packet-switching or packet-oriented telecommunications network 2 (INTERNET). To be more precise, and as shown in FIG. 1, the switching center 3 is connected via a user channel data interface and a signaling channel data interface to the gateway 5. On the other hand, the gateway 5 represents a data interface IP to the packet-switching telecommunications network 2, which is preferably the INTERNET. This results in the two different telecommunications networks being connected in a relatively simple manner, and this is normally referred to as a "stand-alone gateway".

However, conventional solution is subject to a disadvantage due to the fact that the gateway 5 must receive an additional signaling point code SPC3 in order that it can be specifically selected or addressed via the central signaling system no. 7 of the line-switching telecommunications network 1. In consequence, this means that, when there are a large number of such "stand-alone gateways", there must be a massive enlargement in terms of the signaling point codes SPC for the telecommunications network 1, which on the one hand is extremely costly and on the other hand involves a high risk for the intrinsically closed network structure, since each new element changes the network structure and can cause unpredictable disturbances in the telecommunications network.

FIG. 2 shows a further option for providing a gateway for connecting different telecommunications networks, based on an unpublished company-internal prior art. The same reference symbols in this case denote the same or similar elements, for which reason they will not be described in detail in the following text.

In order to avoid enlarging the signaling point code by introducing a stand-alone gateway, the gateway as shown in FIG. 2 is subdivided into a user channel data converter 50' and a signaling channel data converter 51', with the user channel data converter 50' converting only that user channel data which comes from the switching center 3 to a corresponding IP format. The actual evaluation and conversion of the signaling data is carried out in the switching center 3 or in a signaling channel data converter 51' which is directly integrated in it and which actuates the user data channel converter 50' via a specific signaling data interface MGCP (media gateway control protocol) in order to select appropriate address information for the packet-switching telecommunications network 2. Consequently, the extremely critical enlargement of the signaling point code (SPC) in the line-switching telecommunications network is avoided, since the switching center 3, with its signaling point code SPC1, now provides not only the gateway and the user channel data converter 50' but also the message transfer point for the switching center 3 in the central signaling system no. 7 for the line-switching telecommunications network 1. Since the network structure is not changed, there is no risk of disturbances in the telecommunications network 1, which continues to have extremely short downtimes. However, a solution such as this has the disadvantage that a manufacturer of such a solution must have very detailed knowledge of the respective switching centers in the line-switching telecommunications network 1 and, in consequence, this can be done only by system manufacturers of the telecommunications network 1.

A further option (not illustrated) for providing a gateway for connecting different telecommunications networks is to provide the user channel data converter 50', which is illustrated in FIG. 2, such that it is likewise integrated in the switching center 3, so that there are no external components whatsoever, and a solution can be offered, "from the same source". However, like the solution described above, this is likewise disadvantageous owing to the fact that only system manufacturers with detailed knowledge of the respective switching center 3 can provide such integration of the gateway.

Furthermore, the document Anquetil L-P et al.: "Media Gateway Control Protocol and Voice over IP Gateways", Electrical Communication, Alcatel Brussels, BE, 1 Apr. 1999, pages 151–157 uses a media gateway controller for connecting a line-switching telecommunications system based on SS7 to a packet-switching telecommunications system based on the IP. Complex signaling gateways are in this case used for passing on the signaling information.

SUMMARY OF THE INVENTION

The invention provides a gateway for connecting telecommunications networks, and an associated method, in which a connection can be produced easily and cost-effectively without any significant intervention in the network structure of one of the telecommunications networks.

In one embodiment, by connecting a user channel data converter via at least one additional line-switching user/signaling channel data interface and by the insertion of a signaling channel data converter into an already existing user/signaling channel data interface for the line-switching telecommunications network, with the signaling information which is transmitted on this data interface being filtered out for the additional user/signaling channel data interface, a line is obtained to a packet-switching telecommunications network, without in the process having to change the network structure of the line-switching telecommunications network. In particular, this means that there is no need to allocate any additional signaling point code, while nevertheless producing a virtually "stand-alone gateway" solution.

The signaling channel data converter is preferably connected via a specific signaling channel data interface to the user channel data converter, thus resulting in the user channel data converter being actuated in a particularly simple manner.

Furthermore, a further signaling channel data interface can also be directly connected to the packet-switching telecommunications network, thus allowing a direct path search in accordance with the latest IP Standards.

Furthermore, the signaling channel data converter and/or the user channel data converter may be based on redundant design, in order to improve the reliability.

The other dependent claims characterize further advantageous refinements of the invention.

BRIEF DESCRIPTION OF THE DRAWINGS

The invention will be described in more detail in the following text using exemplary embodiments and with reference to the drawings, in which.

DETAILED DESCRIPTION OF THE INVENTION

Figure 1:
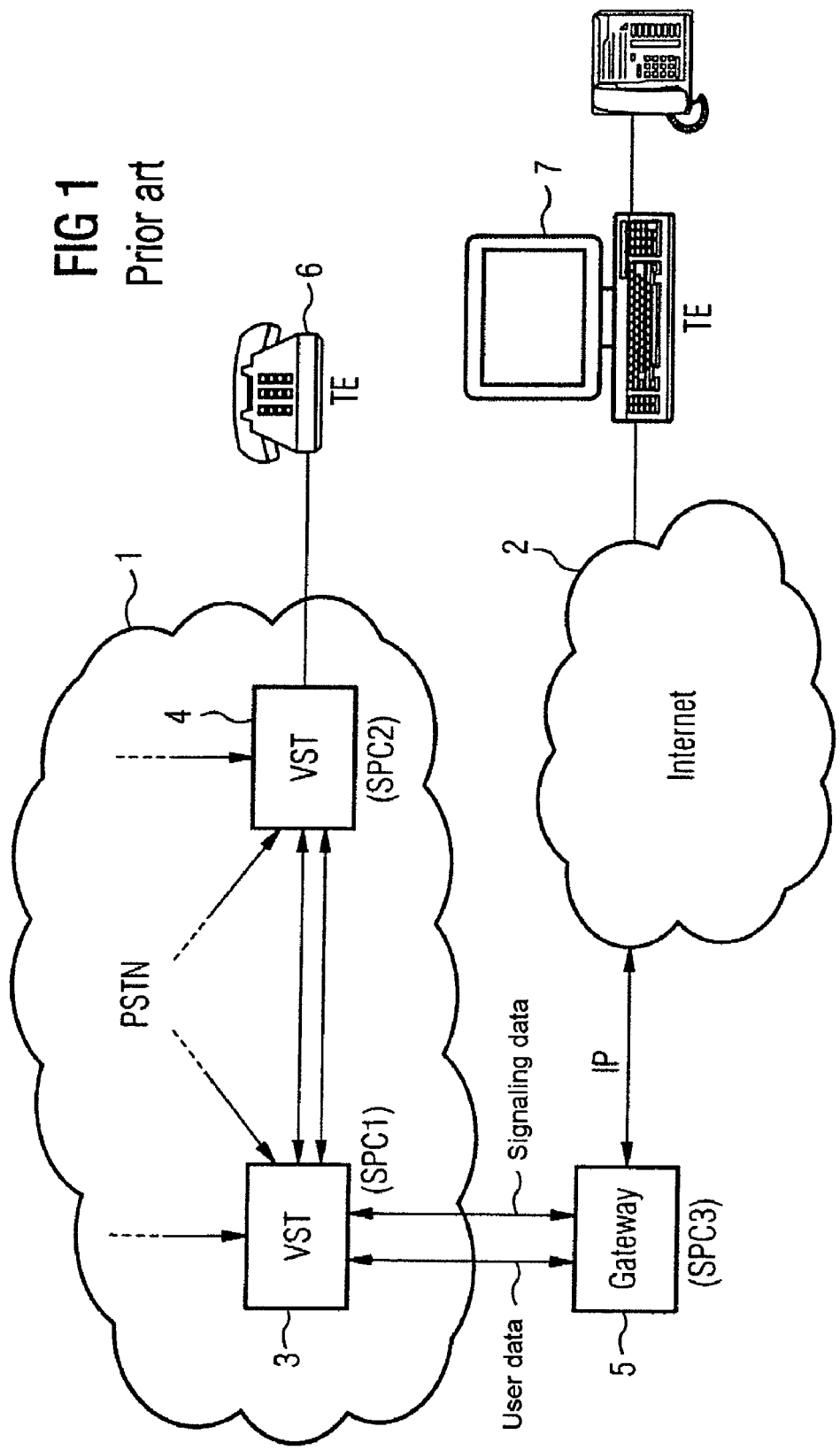
FIG. 1 shows a simplified illustration of a gateway structure according to the prior art.
Figure 2:
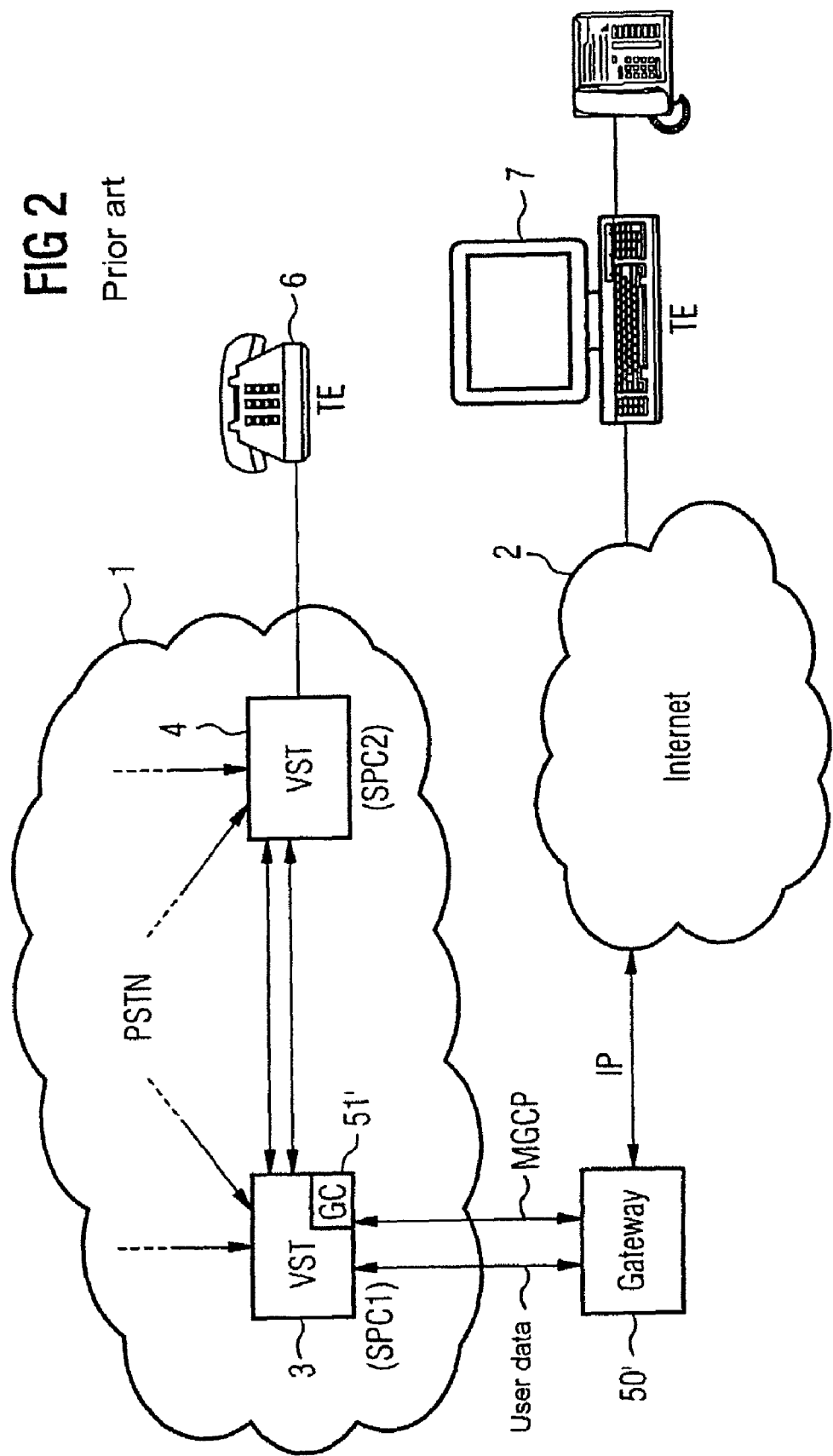
FIG. 2 shows a simplified illustration of a further gateway structure according to the prior art.
Figure 3:
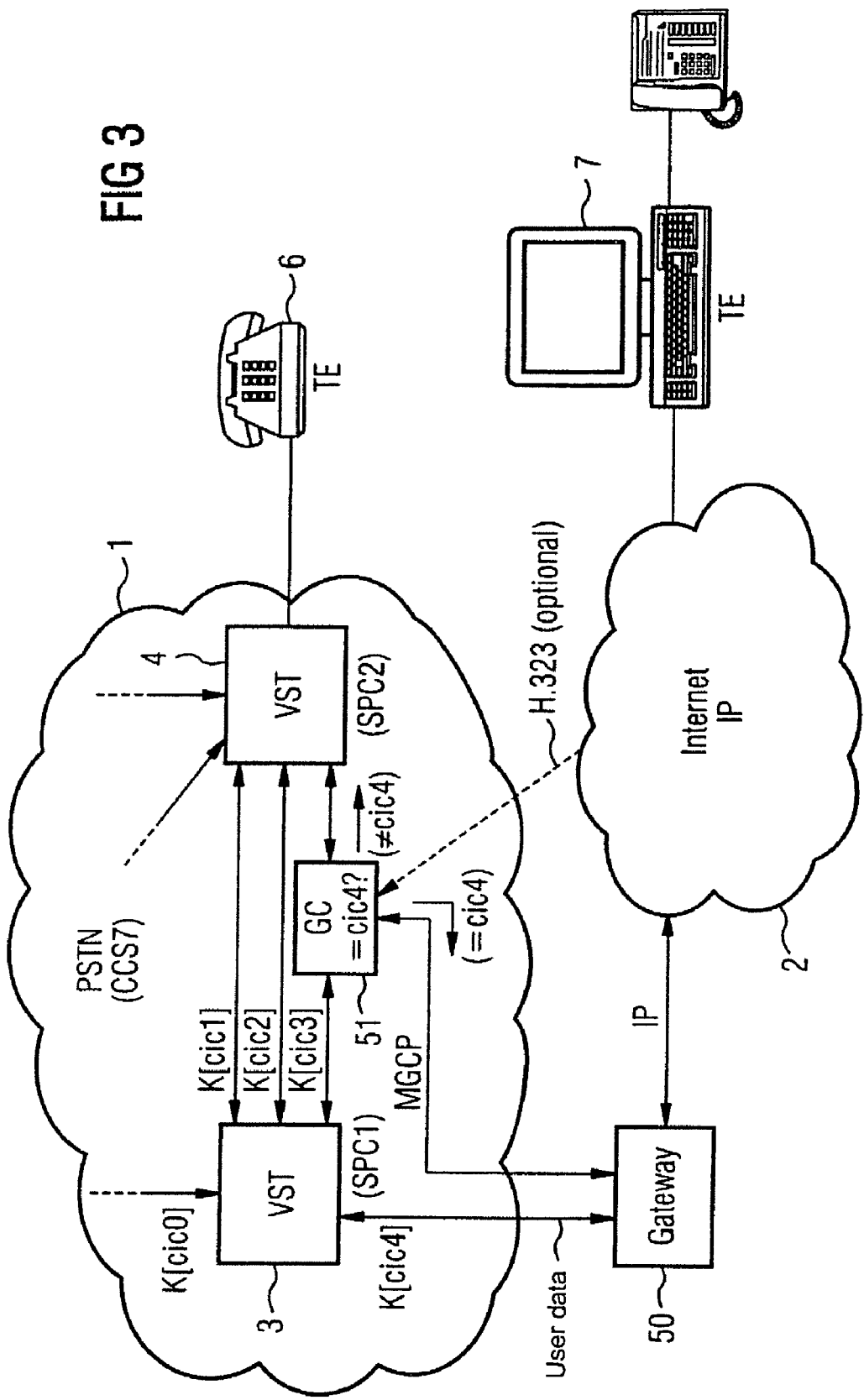
FIG. 3 shows a simplified illustration of a gateway structure according to the invention.

FIG. 3 shows a simplified illustration of a gateway structure according to the present invention, with the same reference symbols being used to denote the same or similar elements as those in FIGS. 1 and 2, and with no detailed description being given in the following text.

According to FIG. 3, a line-switching telecommunications network 1 (public switched telephone network, PSTN) comprises a large number of switching centers 3 and 4, which are connected to one another via a large number of user/signaling channel data interfaces k[cic0] to k[cic3]. The signaling in the line-switching telecommunications network 1 is preferably carried out using the central signaling system no. 7 (CCS7, common channel signaling system no. 7) but is not restricted to this. The user/signaling channel data interfaces k[cic0] to k[cic3] are in this case used both for transmitting user channel data as well as for transmitting signaling channel data, and preferably comprise PCM30 transmission lines.

As shown in FIG. 3, in order to link the line-switching telecommunications network 1 to a packet-switching or packet-oriented telecommunications network 2, a further line-switching user/signaling channel data interface k[cic4] is also set up, having a user channel data converter or Media Gateway 50 for converting user channel data between the PCM30 format for the line-switching telecommunications network 1 and the format which is used in the packet-switching telecommunications network 2 and is, for example in the INTERNET, the Internet Protocol IP.

The additional user/signaling channel data interface k[cic4] is preferably used for transmitting user channel data (for example speech channels), which have unique speech circuit addresses (CIC, circuit identification code), by means of which they can be identified uniquely within the user/signaling channel data interface k[cic3]. To be more precise, the additional user/signaling channel data interface k[cic4] has an additional associated speech circuit address cic4, which is permanently set and is transmitted, for example, via one signaling channel of the user/signaling channel data interface k[cic3]. As has already been described in the introduction, this speech circuit address (cic) allocates a respective signaling message to a predetermined user channel, and assigns it to this user channel permanently.

Furthermore, a signaling channel data converter 51 (gateway controller, GC) is inserted into the user/signaling channel data interface k[cic3], essentially representing a filter function for the speech circuit addresses cic4 transmitted in the user/signaling channel data interface k[cic3]. In this case, the signaling channel data converter 51 knows these new speech circuit addresses (for example cic4), while the switching center 4 (VST) located behind it does not know these new speech circuit addresses (for example cic4) from the signaling point code SPC2 of the switching center 4, and does not need to know them either.

The signaling channel data converter 51 checks whether one of the incoming signaling messages from the switching center 3 with the signaling point code SPCL affects one of the new or additional speech circuit addresses (for example cic4). If this is not the case, the signaling messages are passed on transparently, without any modification, to the switching center 4. However, if a signaling message to the predetermined speech circuit address (for example cic4) is detected, which is associated with a user channel of the user/signaling channel data interface k[cic4], then this signaling message is filtered out, or is removed from the respective timeslot in the signaling system, and is then evaluated.

The filtered-out predetermined speech circuit address (for example cic4) and the associated signaling message are used as the basis for conversion, for example, to the Media Gateway Control Protocol (MGCP) for actuation of the user channel data converter 50 which, on the basis of this received information, packages the user channel data into appropriate packets and sends them to associated addresses in the packet-switching telecommunications network 2. The specific signaling interface which exists between the user channel data converter 50 and the signaling channel data converter 51 is preferably formed by an ETHERNET interface.

As shown in FIG. 3, a further signaling interface in accordance with the H.323 Standard can optionally be provided in order to form direct signaling interfaces and is, by way of example, connected directly to the packet-switching telecommunications network 2, allowing a direct path search in the packet-switching telecommunications network 2. Such a signaling interface has defined network gateways for example between ISDN and ATM, and thus guarantees interoperability of different manufacturers' products. It is thus possible to use the H.323 Standard for multimedia communication, which does not provide or require any guaranteed quality of service.

Figure 4:
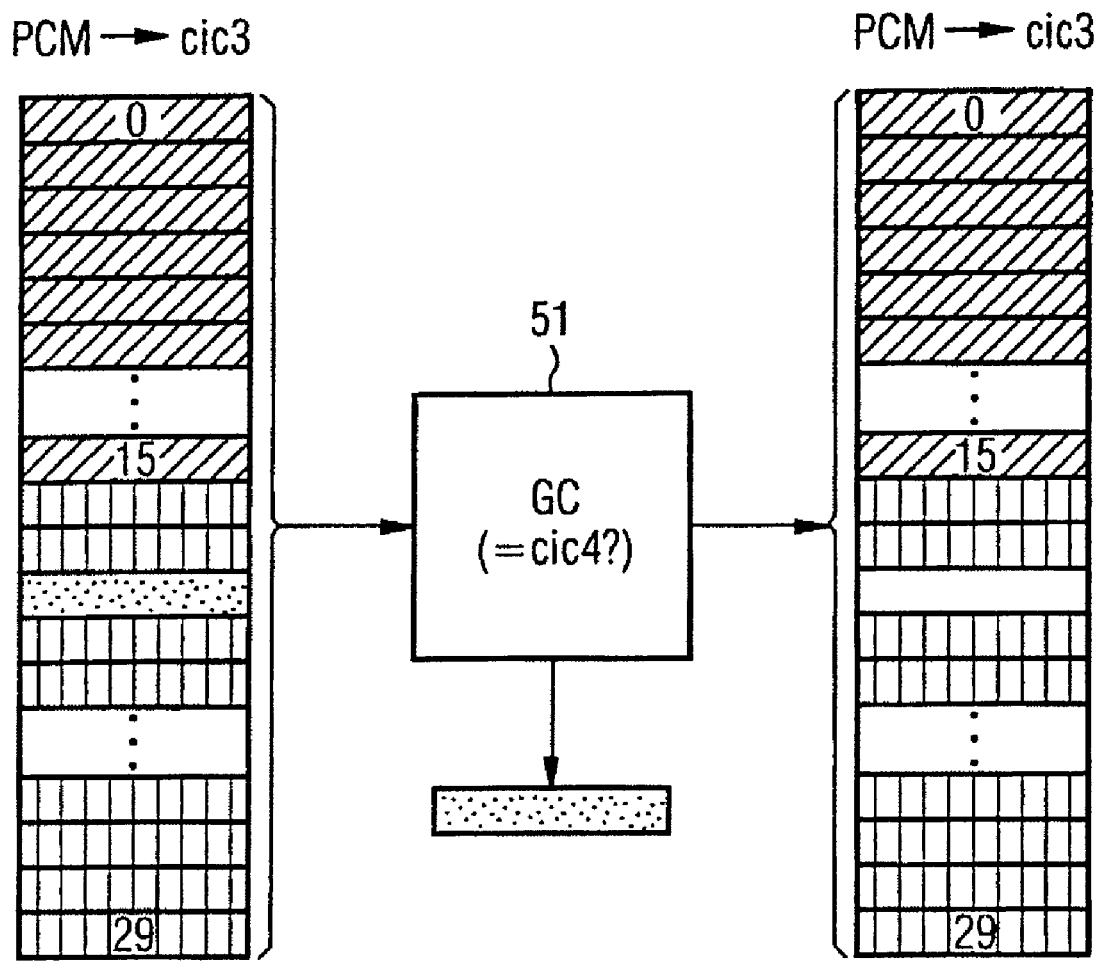
FIG. 4 shows a schematic illustration to show the method of operation of a signaling channel data converter as shown in FIG. 3.

FIG. 4 shows a schematic illustration showing the method of operation in the signaling channel data converter 51 as shown in FIG. 3. The left-hand side in this case shows a simplified illustration of a PCM30 data interface such as that which exists, for example, between the switching center 3 and the signaling channel data converter 51. In contrast, the right-hand side shows a simplified illustration of a PCM30 data interface such as that which exists, for example, between the signaling channel data converter 51 and the switching center 4.

As shown in FIG. 3, this data interface has the speech circuit address cic3, by which means its user channels are uniquely defined. In the illustration shown by way of example in FIG. 4, the user channel data ND is located in the first 16 channels of the PCM30 data interface. The signaling channel data SD which belongs, for example, to the central signaling system no. 7 (CCS7) is in this case located in the other channels. Signaling channel data using the speech circuit address cic4, that is to say SD(cic4) can now be provided simply by changing or modifying routing tables in the switching center 3, with such data being uniquely associated with the user/signaling channel data interface k[cic4], for example, as shown in FIG. 3. Such signaling data SD(cic4) is represented by dots in FIG. 4, while the other signaling data SD(x) for the other user channels and other user/signaling channel data interfaces shaded.

According to the present invention, a specific check of the signaling data is now carried out in the signaling channel data converter 51, while the user channel data ND is passed on without any further check, transparently, to the switching center 4. If the signaling channel data converter 51 includes at least one of the new or additional speech circuit addresses (for example cic4) during the check of the transmitted signaling data SD, then this address is removed from the PCM30 frame, while the rest of the signaling data SD(x) is once again passed on transparently to the switching center 4. The new or additional signaling message determined in this way and having the respective new or additional speech circuit address (for example cic4) is then evaluated, and is converted to an appropriate protocol (for example MGCP) for actuating the user channel data converter 50, or directly for actuating the packet-switching telecommunications network 2 (H.323).

This results in a gateway implementation in which there is no need to carry out any significant change for the network structure and, in particular, there is no need to enlarge the signaling point codes (SPC), since the signaling channel data converter 51 exists only for the switching center 3 and, so to speak, this converter is invisible for the other switching centers in the network. It is thus possible to create a connection between different telecommunications networks in a simple and cost-effective manner, without introducing a new signaling point code (SPC) and without any major change to the hardware structure, that is to say to the switching centers (VST).

The invention has been described above on the basis of the INTERNET for a packet-switching telecommunications network with its associated Internet Protocol. However, it is not restricted to this and, in fact, covers any other packet-switching or packet-oriented telecommunications network. In the same way, a line-switching telecommunications network using a signaling network based on the central signaling system no. 7 has been described above. In the same way, any other line-switching telecommunications network with some other signaling system may also be used.

What is claimed is:

1. A gateway for interconnection of a line-switching telecommunications network and a packet-switching telecommunications network, comprising: a user channel data converter to convert user channel data between a line-switching format and a packet-switching format; and a signaling channel data converter to convert signaling data between the line-switching format and a packet-switching format, wherein the user channel data converter is connected via at least one additional line-switching user/signaling channel data interface for transmission of user channel data to a switching center in the line-switching telecommunications network, and via a packet-switching data interface to the packet-switching telecommunications network, and the signaling channel data converter is connected in a predetermined user/signaling channel data interface by which signaling information which is transmitted on the user/signaling channel data interface for the additional user/signaling channel data interface is filtered out, and the signaling channel data converter actuates the user channel data converter on the basis of the filtered-out signaling information.

2. The gateway as claimed in patent claim 1, wherein the signaling channel data converter actuates the user channel data converter via a signaling channel data interface.

3. The gateway as claimed in patent claim 1, wherein the signaling channel data converter is connected via a signaling data interface directly to the packet-switching telecommunications network, and allows a direct path search in the packet-switching telecommunications network.

4. The gateway as claimed in claim 1, wherein the line-switching format uses the central signaling system no. 7, and the packet-switching format uses the Internet Protocol.

5. The gateway as claimed in claim 2, wherein the specific signaling data interface represents an ETHERNET data interface, and uses the Media Gateway Control Protocol as the format.

6. The gateway as claimed in claim 1, wherein the signaling channel data converter passes on all the user channel data and non-relevant signaling data transparently.

7. The gateway as claimed in claim 1, wherein the signaling channel data converter is based on redundant design.

8. The gateway as claimed in claim 1, wherein the user channel data converter is based on redundant design.

9. The gateway as claimed in claim 1, wherein the line-switching user/signaling channel data interfaces represent PCM30 data interfaces.

10. A method for interconnecting a line-switching telecommunications network and a packet-switching telecommunications network comprising:

a) transmitting user channel data via a line-switching user/signaling channel data interface;

b) transmitting signaling information for the additional line-switching user/signaling channel data interface via a predetermined user/signaling channel data interface;

c) filtering out and evaluating the transmitted signaling information; and d) actuating a user channel data converter to convert the transmitted user channel data from a line-switching format to a packet-switching format as a function of the evaluated additional signaling information.

11. The method as claimed in patent claim 10, wherein during the filtering process the user channel data and non-relevant signaling data is passed on transparently in the user/signaling channel data interface.

12. The method as claimed in claim 10, wherein the evaluating of the signaling information includes conversion to a Media Gateway Control Protocol.

13. The method as claimed in claim 10, wherein the evaluating of the signaling information includes conversion to an H.323 protocol.

14. The method as claimed in claim 10, wherein the packet-switching format uses an Internet Protocol, and the line-switching format uses a protocol in accordance with the central signaling system no. 7.

* * * * *